Figure 1:
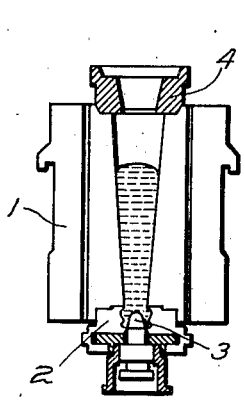

June 2, 1936. G. E. ROWE 2,043,065
METHOD OF FORMING HOLLOW GLASS ARTICLES
Filed Oct. 1, 1935

Witness:
W. B. Thayer.

Inventor:
George E. Rowe
by Brown + Parham
Attorneys

Patented June 2, 1936

2,043,065

UNITED STATES PATENT OFFICE 2,043,065

METHOD OF FORMING HOLLOW GLASS ARTICLES

George E. Rowe, Wethersfield, Conn., assignor to Hartford-Empire Company, Hartford, Conn., a corporation of Delaware Application October 1, 1935, Serial No. 42,989

6 Claims. (Cl. 49—80)

My present invention relates to a method of forming hollow glass articles and particularly to the forming of such articles by a novel variation of the "narrow neck" process.

One of the most common and best known defects in ware made by the "narrow neck" method is what is known as the "settle wave". This wave is due to a line or narrow zone of demarcation part way up the sides of an article marking a division between wall sections of two different thicknesses.

The difficulty arises in this way. When articles are made according to the ordinary "narrow neck" process, the glass is first settled in the blank mold, which is in a neck-down position, the glass being settled in a compact body reaching part way up the sides of the mold. The glass in contact with the walls of the mold is chilled thereby to form a skin which is gradually thickened with prolonged contact time. When thereafter the glass is expanded into conformity with the whole internal configuration of the blank mold cavity, the interior glass which is hot is forced out and into contact with the remainder of the wall surface of the mold cavity not initially in contact with glass. The initial skin formed as aforesaid is usually not disturbed to any great extent. This hot glass now forced into contact with the remainder of the walls of the mold cavity also forms a skin, but due to the fact that it is in contact with the mold walls for a shorter time, the skin is thinner than that initially formed by the settling process.

The parison formed by the counterblowing is then reheated for a desired length of time which softens the entire skin to some extent, but does not entirely eliminate the inequality in skin thickness between the two portions. When thereafter the parison is blown to final form, the walls will be found to have two different thicknesses meeting in a line or zone surrounding the bottle part way up the sides. This line or zone is obvious to the eye and forms what is known as the "settle wave".

A primary object of my present invention is to eliminate or to minimize the settle wave formation as aforesaid and also to secure more uniform distribution of glass throughout the walls of the completed article.

Further and more detailed objects of the invention relate to the attaining of the above specifically by cracking the blank mold one or more times intermediate the settling of the glass and the counterblowing thereof to form a completed hollow parison.

Specifically it is a further object of the invention to provide for the accomplishment of the above objects using present commercial machines with a minimum of changes in the structure thereof.

Other objects and advantages of my present invention will become apparent from a reading of the following specification and appended claims, all when taken in connection with the accompanying drawing, in which:

Figures 1 to 8 inclusive are a series of more or less diagrammatic views illustrating certain steps in the process of forming an article of hollow glassware, including my novel improvement.

My present process may be employed using many machines for making ware by the "narrow neck" process whether those machines be of the stationary or rotary type, and if they be rotary, whether they be provided with one or more rotatable tables and/or whether those tables be intermittently or continuously rotated.

I have chosen to illustrate the invention, however, by a series of diagrammatic views using molds and associated equipment such as are used on the commercial "Hartford I. S." machine, which machine may with very little variation be adapted for the performance of my process hereinafter to be set forth. This machine is disclosed in Ingle Patent No. 1,911,119, granted May 23, 1933. Reference may be had to that patent for a complete disclosure of a machine including operating means and adjustable timing means which could be utilized in the carrying out of the process hereinafter to be set forth.

As shown, a charge of glass is adapted to be supplied to a blank mold 1 which is of the partible type and is arranged in permanent neck-down position in the "I. S." machine, although as above set forth, it will be understood that the process could as well be carried out by a machine in which the blank molds are bodily inverted, such as the commercial "Lynch LA" machine for example. The blank mold 1 has associated therewith a neck ring 2 and neck pin 3, it being understood that suitable means are provided as disclosed for example in the Ingle patent aforesaid for independently opening and closing the blank mold and neck ring and for independently moving the neck pin to and from its operative position.

At the time a charge of glass is supplied to the blank mold, this mold, the neck ring and the neck pin are in the position shown in Fig. 1 and the charge is supplied thereto through the open upper end of the blank mold through a funnel 4. This funnel is also a part of the commercial "I. S." machine and it and its operating means are disclosed in the aforesaid Ingle patent.

Figure 2:
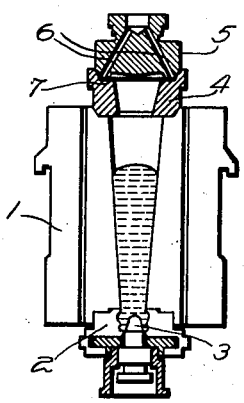

Subsequent to the supplying of the glass to the blank mold as shown in Fig. 1, a combined settle blow head and counterblow baffle here indicated at 5 is placed on top of the funnel as shown in Fig. 2, the pressure supplying ducts 6 formed in the member 5 as shown communicating with a space 7 intermediate the lower side of the member 5 and a cut-out portion of the funnel 4 and thence communicating with the interior of the funnel and with the interior of the mold cavity. This is the same apparatus and practice as is used in the "I. S." machine and is fully disclosed in the Ingle patent aforesaid. As shown herein, settle blowing pressure is supplied through the passages 6 under the control of suitable timing means (not shown) but preferably the same as disclosed in the Ingle patent, to settle the glass in the blank mold, this stage of the process being illustrated in Fig. 2.

It will be understood that any other desired type of settling of the glass in the blank mold may be employed and my process carried on as hereinafter set forth. Among such other processes are those disclosed in my prior Patents Nos. 1,945,982 and 1,945,983, both granted Feb. 6, 1934.

Figure 3:
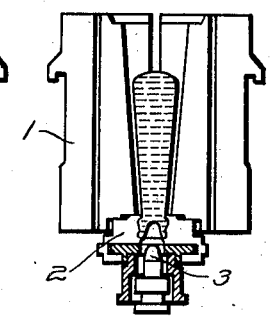

Subsequent to the settling of the glass in the blank mold and preferably during the time the neck pin is withdrawn for permitting reheat of the corkage of the article, I provide the novel step of cracking the blank mold a slight amount, so as to free the glass of contact with the cooler walls of the mold and permit heat contained in the hotter interior portions of the glass to soak through and soften the skin which has been formed as above set forth upon the sides of the charge or blank by contact with the walls of the mold. This step of the process is shown in Fig. 3. During this time the blank mold is retained substantially surrounding the glass, thereby preventing undue loss of heat from the surface of the glass and tending to shorten the time necessary for reheat.

Figure 4:
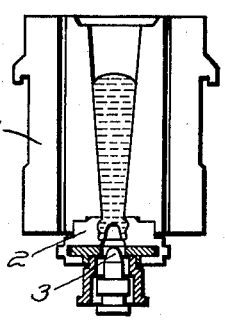
Figure 5:
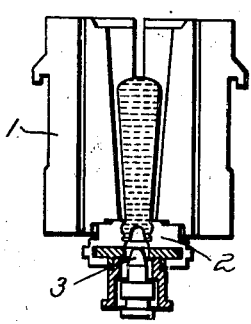

I have shown in Figs. 4 and 5 succceeding steps of the process which may be utilized in the event that the process is to be carried out with a permanently inverted blank mold, that is, successive crackings and reclosings of the blank mold to cause the reheating periods to be broken up by periods during which the glass is supported by contact with the walls of the mold. This may be necessary or desirable in certain installations due to the fact that if the desired whole period of reheating were to take place all at once, the glass might sag to such an extent due to its being supported only by the finished neck portion that upon reclosing of the mold, some glass might be pinched between the portions of the mold which normally should contact with one another. I have found in practice that by successively cracking and reclosing the mold, no difficulty arises due to this sagging and pinching of the glass between the halves or mating portions of the mold, while the desired reheating is obtained.

The cracking of the mold may be accomplished by mechanism specifically illustrated and described in the Ingle patent aforesaid, but as disclosed in the patent, the mold cracking means are utilized only subsequent to the completion of the counterblowing. Cracking of the blank mold as taught herein may be done by the provision of one or more buttons in the grooves of the timing drum used with the "I. S." machine disclosed in the Ingle patent which operate to control the opening and closing of the blank mold. Inasmuch as the construction for accomplishing my purpose has been completely disclosed in the Ingle patent in an operative form, it is deemed unnecessary to repeat this disclosure here either in the drawing or in the present specification.

Particularly when my process is to be used in conjunction with machines of the type in which the blank mold is bodily invertible, I contemplate that but one cracking thereof need ordinarily be used. In this cracking, the mold may be kept cracked for a total period of time equal to that desired for the reheating of the skin of the body portion of the blank formed by the settling operation. Also in machines of this type, such for example as the "Lynch LA" machine, it is contemplated that the cracking could be effected under control of suitable cams similar to those provided on the machine for closing the blank mold for effecting the cracking during the inversion of the mold, all according to the desire of the operator and the design of the particular equipment to be used in practicing the novel process herein taught.

In any event, subsequent to the cracking of the mold for the reheating of the sides of the settled blank which have been in contact with the mold during the settling operation, whether that cracking takes place for one single interval or several succcessive intervals, as aforesaid, the blank mold will again be closed preparatory to the counterblowing operation.

Figure 6:
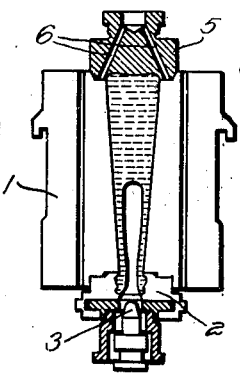

I have illustrated in Fig. 6 the arrangement of parts of the "I. S." machine during counterblowing. In this figure, the member 5 is employed as a counterblow baffle, the funnel 4 having been removed and the member 5 is seated directly on the top of the mold I in such manner that the lower ends of the passages 6 are sealed off by contact with an upper surface of the mold I. The neck pin 3 has previously been withdrawn and counterblowing pressure is supplied through the neck ring 2 in the manner now in commercial use in the "Hartford I. S." machine to expand the glass into conformity with the internal cavity of the blank mold I and up against the baffle 5.

Figure 7:
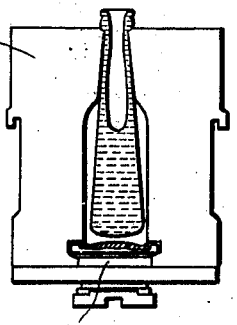
Figure 8:
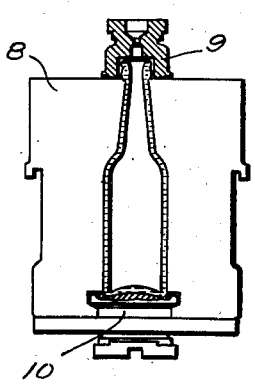

Subsequent to the counterblowing, the glass which is now in the form of a hollow parison, as shown in Fig. 6, is transferred to a blow mold 8, shown in Figs. 7 and 8, in any manner consistent with the arrangement of the particular machine, including the manner now in use in the commercial "Hartford I. S." machine disclosed in the Ingle patent aforesaid, by inverting the neck ring, carrying the blank with it subsequent to the opening of the blank mold and removal of the head 5, closing the blow mold, then releasing the blank from the neck ring to the closed blow mold. This stage of the process is shown in Fig. 7, the parison being in the blow mold and reheating for a desired time prior to the application of final blowing pressure. Final blowing pressure may then be supplied to the interior of the parison in the blow mold through the head 9 to blow the parison to final form as shown in Fig. 8, it being understood that the usual bottom plate 10 is associated with the final blow mold at the time that mold is closed, as is done in the usual practice.

Due to the fact that the blank mold is cracked one or more times intermediate the settling and the counterblowing for reheating the blank at this period, the skin which has been formed on the sides of the blank by the settling operation is softened by heat soaking through from the hotter interior glass. When thereafter the glass is expanded into conformity with the cavity of the blank mold as shown in Fig. 6, the surface glass of the blank is so nearly homogeneous that the expansion is substantially uniform and there will be little or no difference between the thickness of the skin remaining on that portion of the hollow parison which was in contact with the mold upon the settling of the blank and the other portion which is thereafter in contact with the mold due to the counterblowing. Thus the cause of the "settle wave" as above set forth is wholly, or to a great extent, eliminated and the ware when finally completed has a superior appearance and consequently a higher sale value. This superior operation due to the use of my improved process has been demonstrated by actual test in the commercial making of glassware using a commercial "Hartford I. S." machine, such as the machine disclosed in the Ingle patent aforesaid. The results have proven that the ware is superior in appearance, and in general glass distribution in the walls of the completed articles, than ware made according to prior practices.

While I have illustrated but one form of apparatus by which my method may be practiced and have taught that method in certain essential details, I contemplate that many changes including those hereinabove suggested may be made in specific details of the application of my novel method, and I do not wish to be limited therefore except by the scope of the appended claims, which are to be construed as broadly as the state of the prior art permits.

I claim:

1. The method of forming hollow glass articles, comprising settling a charge of plastic glass in a blank mold and a neck ring associated therewith, cracking the blank mold to permit the reheating of the body portion of the settled blank, reclosing the blank mold about the settled blank, expanding the glass in the blank mold into conformity with the internal cavity thereof, transferring the hollow parison thus formed from the blank mold to a blow mold, and expanding the parison to final form in the blow mold.

2. The method of forming hollow glass articles, comprising settling a charge of plastic glass in a blank mold and a neck ring and around a neck pin associated therewith, cracking the blank mold to permit the reheating of the body portion of the settled blank while retaining the blank mold in a position spaced but a short distance from the glass during the cracking to aid in the reheating thereof, withdrawing the neck pin out of contact with the glass at substantially the same time the blank mold is cracked for reheating the corkage portion of the glass, reclosing the blank mold about the settled blank, expanding the glass in the blank mold into conformity with the internal cavity thereof, transferring the hollow parison thus formed from the blank mold to a blow mold, and expanding the parison to final form in the blow mold.

3. The method of forming hollow glass articles, comprising settling a charge of plastic glass in a blank mold and a neck ring associated therewith, cracking the blank mold and reclosing it a plurality of times to permit the reheating of the body portion of the settled blank during the periods in which the blank mold is cracked, reclosing the blank mold about the settled blank, expanding the glass in the blank mold into conformity with the internal cavity thereof, transferring the hollow parison thus formed from the blank mold to a blow mold, and expanding the parison to final form in the blow mold.

4. The method of forming hollow glass articles, comprising settling a charge of plastic glass in a blank mold and a neck ring associated therewith by supplying pneumatic pressure to the upper end of the blank mold above the charge to force it downwardly into contact with the side walls of the blank mold and into the neck ring which is arranged beneath the blank mold at that time, cracking the blank mold a relatively small amount to move it out of contact with the body portion of the glass for the reheating thereof while retaining the blank mold in a position substantially surrounding and adjacent to the glass to aid in the reheating thereof, reclosing the blank mold about the settled blank, expanding the glass in the blank mold into conformity with the internal cavity thereof by supplying pneumatic pressure to the inside of the glass through the neck ring, transferring the hollow parison thus formed from the blank mold to a blow mold, and blowing the parison to final form in the blow mold.

5. The method of forming hollow glass articles, comprising settling a charge of plastic glass in a blank mold and a neck ring associated therewith by the application of differential pressures to the opposite ends of the mold cavity, cracking the blank mold to permit the reheating of the body portion of the settled blank, reclosing the blank mold about the settled blank, expanding the glass in the blank mold into conformity with the internal cavity thereof by supplying pneumatic pressure to the inside of the glass through the neck ring, transferring the hollow parison thus formed from the blank mold to a blow mold, and blowing the parison to final form in the blow mold.

6. The method of forming hollow glass articles, comprising settling a charge of plastic glass in a blank mold and an associated neck ring and around a neck pin in operative position in respect to the neck ring by the application of pneumatic pressure applied through the upper end of the blank mold above the glass, cracking the blank mold a plurality of times and withdrawing the neck pin from contact with the glass to permit the reheating of the exterior of the body portion of the settled blank and the interior of the corkage portion of the neck, reclosing the blank mold into contact with the glass intermediate each of the cracking operations and after the final cracking operation aforesaid, expanding the glass in the blank mold into conformity with the internal cavity thereof and against a baffle cooperating with the end of the mold by supplying pneumatic pressure to the inside of the glass through the neck ring into the cavity formed by the neck pin, transferring the hollow parison thus formed from the blank mold to a blow mold, and blowing the parison to final form in the blow mold.

GEORGE E. ROWE.